United States Patent [19]

Noland et al.

[11] 4,069,409
[45] Jan. 17, 1978

[54] ELECTRICALLY HEATED FLUID COUPLING APPARATUS

[76] Inventors: Wayne B. Noland, 340 Crescent Drive, Carlisle, Iowa 50047; Gail L. Noland, 4530 W. 38th St., St. Louis Park, Minn. 55416

[21] Appl. No.: 599,385

[22] Filed: July 28, 1975

[51] Int. Cl.² .......................... H05B 3/02; F16L 53/00; F24H 1/12; A01K 7/00
[52] U.S. Cl. ........................................ 219/301; 119/73; 137/297; 137/301; 137/341; 138/33; 219/315; 219/523; 219/214
[58] Field of Search ............... 219/523, 301, 214, 535, 219/315; 119/73, 75; 138/31-34; 137/297, 301, 302, 59, 60, 341

[56] References Cited

U.S. PATENT DOCUMENTS

| | | | |
|---|---|---|---|
| 2,479,355 | 8/1949 | Hemker | 219/301 X |
| 3,049,094 | 8/1962 | Smith | 119/75 |
| 3,120,600 | 2/1964 | True | 219/301 |
| 3,364,337 | 1/1968 | Kahn | 219/301 |
| 3,381,667 | 5/1968 | Martin | 119/75 |
| 3,563,264 | 2/1971 | Boegli | 119/75 |
| 3,784,785 | 1/1974 | Noland | 219/301 |
| 3,932,727 | 1/1976 | True | 219/301 |
| 3,949,707 | 4/1976 | Armstrong et al. | 119/73 |

Primary Examiner—A. Bartis
Attorney, Agent, or Firm—Henderson, Strom & Sturm

[57] ABSTRACT

An electrically heated fluid coupling apparatus having an electrical resistance heating element positioned inside a hollow heating conduit which runs along the side of the fluid conduit, which conduit is connected at its lower end to the fluid source. Positioned opposite the hollow heating conduit along the fluid conduit is a power cable conduit carrying the power cable which connects to the heating element at the top of the apparatus and near the bottom of the apparatus travels away therefrom to be connected to a source of electrical energy. A casing is positioned about the apparatus and thermal insulation fills the area between the casing and the internal components.

3 Claims, 5 Drawing Figures

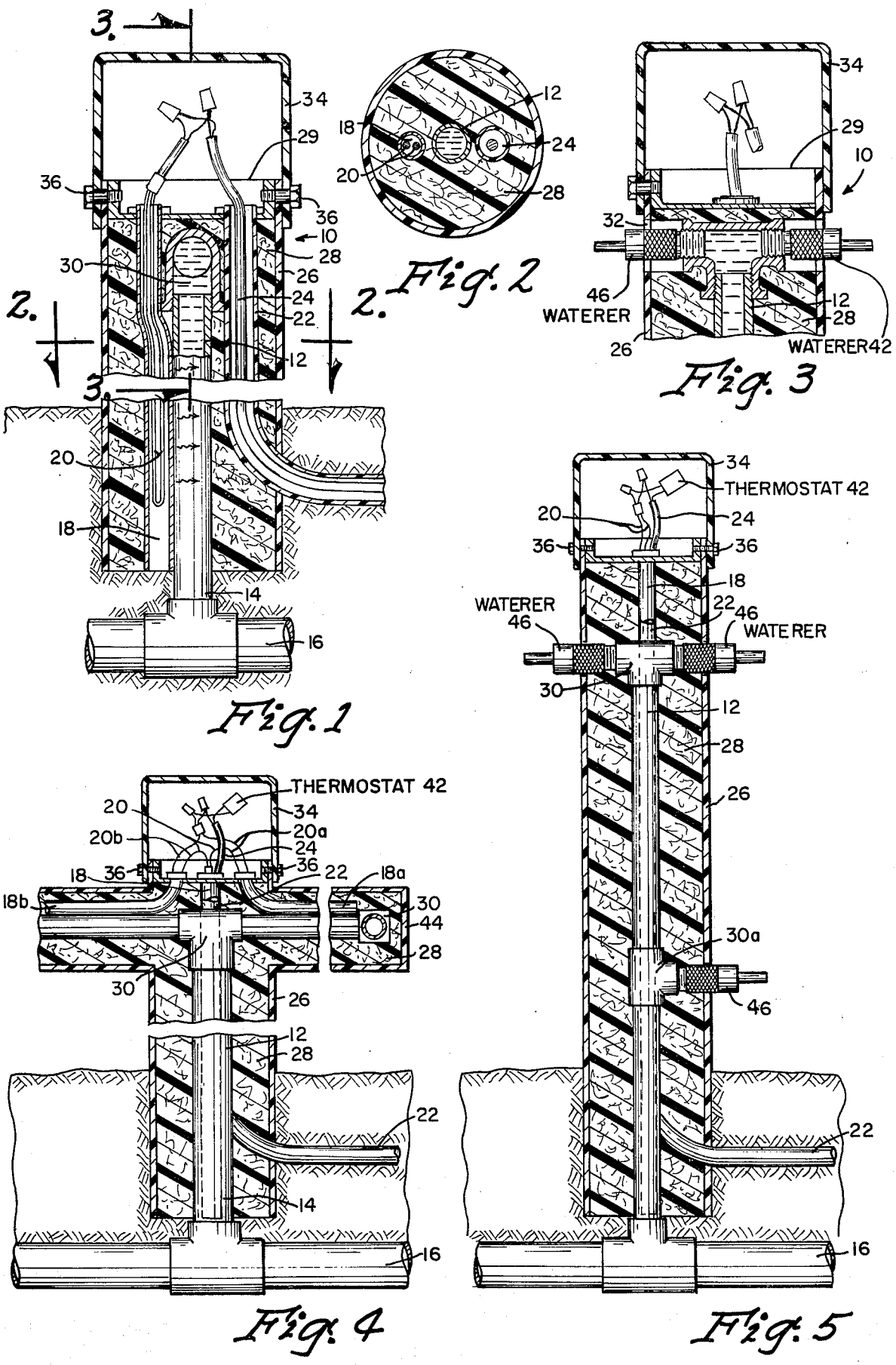

ELECTRICALLY HEATED FLUID COUPLING APPARATUS

BACKGROUND OF INVENTION

1. Field of Invention

The present invention relates generally to a heated fluid coupler and more particularly to an improvement over an electrically heated fluid conduit coupler of the type disclosed in U.S. Pat. No. 3,784,785.

2. Description of the Prior Art

In severe climates where subfreezing temperature occur for prolonged periods of time, water pipes and other fluid carriers must be protected from freezing. This problem is particularly prevalent in the farming industry where livestock watering systems are often directly exposed to severe weather without shelter.

In typical livestock watering systems, water is supplied through a water conduit or riser pipe from an underground source located below the frost line to a point of use above the ground. Since the riser pipe must pass through a region of freezing temperatures, both in the ground and in the air, the pipe must be protected at all times from freezing. Further, where water demands are not constant and only occasional use of water occurs, the water in the riser pipe may stay in this pipe for long periods of time, therefore the source temperature of the water may not be relied upon to provide sufficient freezing protection.

The most common method to prevent the riser pipe from freezing is to place an electric heat tape in contact with the pipe. However, this method of artificially heating the riser pipe presents many problems. If the heat tape is exposed to the severe weather conditions, excessive electrical energy will be required to provide the necessary heat to prevent the riser pipe from freezing.

This disadvantage has been overcome by wrapping the riser pipe and heat tape with several layers of insulating material and providing an outside vapor barrier. However, such a method would not be adaptable for use in a stock watering installation because the insulation surrounding the pipe would be subject to being torn or otherwise damaged by the watering livestock. Such damage could result in sections of the heat tape being exposed both to the elements and to the watering stock. If sections of the heat tape should become torn so that the electrical wiring is exposed to the livestock, a very serious health hazard would exist. Further, with the livestock tampering with the heat tape, its effective operation would be impaired, thereby reducing its operational efficiency and allowing the riser pipe to possibly freeze up.

Another disadvantage associated with the use of heat tapes is that, in some instances, their life may be very short and the heat supplied by them to the riser pipe may become irratic and not dependable. Further, in replacing the heat tape, the complete system must be torn down and a new tape wrapped around the pipe. Such a procedure would not be welcomed in severe weather. Also, it is generally not possible to vary the amount of heat supplied by the electrical heat tape when connected to a 110 volt source. Therefore, in very severe weather conditions when a particular heat tape is not performing up to its specifications, the amount of heat produced may not be sufficient to prevent a riser pipe from freezing.

As noted in U.S. Pat. No. 3,120,600, entitled Freezless Water Supply to Cecil W. True, the use of heating tapes coupled with an outside insulation often fails to prevent the freezing of the riser pipe when it is used in soil which contains much moisture. These failures are occasioned by water seeping through the insulation between the vapor barrier and reaching the pipe during periods of thawing. Then when subfreezing temperatures occur, the water acts as a conductor of the heat causing the heat to pass into the surrounding ground instead if being supplied to the riser pipe; thus, resulting in freezing of the riser pipe.

Furthermore, in the wrapping of heat tapes around the riser pipe, if the tape would touch, overlap or cross over itself, it would tend to overheat and subsequently burn out. Also, in cold weather, heat tapes typically become stiff and difficult to uncoil; thereby, presenting additional problems if a tape must be replaced in subfreezing weather.

Also, because of servicing requirements of heat tapes, it would be impractical to completely bury the power cable underground, thereby necessitating some type of shielding to be placed around the power cable to prevent the watering livestock from interfering and damaging it and themselves.

Another approach was developed by Woodford Manufacturing Company, Des Moines, Iowa entitled Thermaline. Thermaline combines a riser pipe with an operation pipe positioned inside it and an electrical heating element passing down into the operation pipe. Heating occurs through a process of conduction from the heating element to the water in the operation pipe and finally to the water in the riser pipe. The heating element passes through the top of the apparatus to be connected to a 110 volt source. Because of the location of the heating element, an elbow is connected to the top of the apparatus to the riser pipe providing a water tap for external use. The complete Thermaline apparatus is enclosed in insulation with an outer casing on the outside.

The Thermaline unit, while well adapted for its intended use as a water line heater for a mobil home, would present several problems if employed as a livestock water line heater. Because of the placement of the heating element, the power cord from the 110 volt supply would be external and would have to be shielded from the watering livestock. Also, because of the heating element position and the use of the elbow to conduct the water flow, multiple connections to the unit from the water using devices would be difficult if not impossible while still retaining weather protection. Further, multiple units could not easily be used from a single water source with only one water line tap on the main water line and employing only one heating element. Furthermore, with the positioning of the heating element directly in the water supply, additional shielding on the heating elment would be required to insure against its gradual breakdown from a chemical reaction with the water and presenting a very serious electrical shock hazard.

For the above described reasons and considerations, the present methods are not adequate to solve the problems encountered in supplying a source of fresh water in subfreezing temperatures to unsheltered livestock watering installations.

SUMMARY OF THE INVENTION

The above and other disadvantages of the prior art electrically heated fluid conduit couplers are overcome in accordance with the present invention by providing a fluid conduit with a hollow heating conduit positioned in a side-by-side heat exchange arrangement. An elongated electrical heating element is positioned inside the hollow heating conduit. Along the fluid conduit is a tube containing the power cable which cable is connected to the heating element. The power cable passes through the inside of the tube and exits near the bottom of the electrically heated fluid conduit coupler to be connected to a external source of electrical power. The power cable may pass underground to the electric source, thereby not being subject to damage by the livestock or presenting a hazard to them.

Should the heating element need to be replaced, it may easily be removed by withdrawing it from the hollow heating conduit and disconnecting it from the power cable. A new heating element may be installed simply by connecting it to the power cable and passing it through the hollow heating conduit. Furthermore, since the heat production of an elongated heating element is uniform throughout its length, an even heat distribution along the length of the of the hollow heating conduit occurs, thereby supplying an even distribution of heat to the fluid conduit. Also, this type of elongated heating element is not subject to burn out from contact with itself and has a much longer life than that of a typical heating tape.

Positioned around the electrical heated fluid conduit coupler apparatus is an outside casing. The outside casing is constructed of a resilient solid plastic material capable of withstanding the temperature ranges as well as physical abuse from watering livestock. Thermal insulation is provided between the outside casing and the fluid conduit, the heating conduit and the power cable tube. The thermal insulation may be of the type which is poured as a liquid foam into the inside of the outside casing. After a short period of time the foam will harden to form a solid block of insulation. With use of the liquid foam thermal insulation, a solid rigid construction is obtained between the outside casing and the internal parts once the thermal insulation has solidified. Further, the foam thermal insulation provides a waterproof barrier between the internal components of the apparatus and the outside by completely enclosing it.

A top cap is positioned above, is fastened to the outer casing and completely encloses the top thereof. The electrical circuit connections between the power cable and the heating element may be made within the top cap and, in some instances, a heat sensitive thermostat may also be placed within the cap to control the heating element. Further, the top cap forms a seal over the top of the apparatus to prevent weather and livestock from damaging the top of the apparatus.

It is therefore an object of the present invention to provide an improved electrically heated fluid conduit coupler which utilizes a heating element which may be easily replaced in the field under adverse weather conditions.

A second object of the present invention is to provide an improved electrically heated fluid conduit coupler with an external construction capable of withstanding large temperature ranges and physical abuse without being damaged.

A third object of the present invention is to provide an improved electrically heated fluid conduit coupler which does not require above the ground electrical connections.

A fourth object of the present invention is to provide an improved electrically heated fluid conduit coupler utilizing foam thermal insulation around all internal elements of the apparatus without being subject to abuse and damage from watering livestock.

A fifth object of the present invention is to provide an improved electrically heated fluid conduit coupler which is capable of being used where multiple water outlets and connections are required.

Other objects, advantages, and novel features of the invention will become apparent when the following detailed description of the invention is considered in conjunction with the accompanying drawings.

BRIEF DESCRIPTION OF THE DRAWINGS

FIG. 1 is a vertical cross sectional view of the fluid conduit coupler apparatus of this invention;

FIG. 2 is a cross sectional view as seen along the lines 2—2 in FIG. 1;

FIG. 3 is a vertical cross sectional view as seen along the lines 3—3 in FIG. 1;

FIG. 4 is a vertical cross sectional view of an alternate embodiment showing multiple heated conduit; and FIG. 5 is a vertical cross sectional view of another embodiment of the invention showing the provision of multiple access devices applied to a single conduit apparatus.

DESCRIPTION OF THE PREFERRED EMBODIMENT

With reference FIGS. 1-3, the electrically heated fluid coupling apparatus is generally shown at 10. The apparatus consists of a fluid conduit 12 which is adapted at its lower end 14 to be connected to a fluid source 16. A hollow heating conduit 18 is positioned along the side of fluid conduit 12 and runs for the approximate length of the fluid conduit 12. An electric resistance heating element 20 is positioned inside the hollow heating conduit 18 and extends for the approximate length thereof.

Positioned on the other side of the fluid conduit 12 and directly opposite of the hollow heating conduit 18 is a power cable conduit 22. The power cable conduit 22 is located along the same axis as the fluid conduit 12. Positioned inside the power cable conduit is a power cable 24 which interconnects with the electric resistance heating element 20 at the top of the apparatus 10. Near the bottom of the apparatus 10, the power cable conduit 22 passes out of the apparatus for interconnection with a source of electrical energy (not shown).

Located about the fluid conduit 12, the hollow heating conduit 18 and the power cable conduit 22 is a casing 26. Disposed between the inside of the casing 26 and about the fluid conduit 12, the hollow heating conduit 18 and the power cable conduit 22 is thermal insulation 28. The insulation 28 is inserted through the open end of the casing 26 and fills same as illustrated, limited at the upper end by a plate 27. A coupling element 30 is affixed to the top of a fluid conduit 12 in alignment with apertures 32 of the casing 26 and provides and access point for devices using the water. Affixed to the upper end of casing 26 is a an end cap 34 which is secured to the casing by screws 36, which screws 36 also secure the plate 29 in place. End cap 34 completely encloses the top of the apparatus 10 and within which the electric resistance heating element 20 and the power cable 24 are interconnected.

The fluid conduit 12 and the hollow heating conduit 18 are constructed of metal to allow heat to be freely transferred from the hollow heating conduit 18 to the fluid conduit 12. The electric resistance heating element 20 is a typical resistance heating element and may be constructed of a resistance wire wrapped around a heat core with an outside protective coating. This type of construction allows for an extremely flexible heating element and may be easily inserted and removed from the hollow heating conduit 18. Further, heating elements of this nature typically draw very little electric power when connected to a 110 volt power source. The hollow heating conduit 18 is open at both the top and bottom, thus allowing dissipation of moisture that would gather in the tube from the heating and cooling processes and any water that may spill into the apparatus.

As mentioned above, power cable 24 passes through the power cable conduit 22 through the approximate length of the apparatus and makes an electrical connection with the electric resistance heating element 20 in the end cap 34 and passes from the apparatus near the bottom to pass underground if desired to the source of electrical energy. This prevents the watering livestock from damaging the power cable and it removes the danger of an electrical shock to the livestock.

The casing 26 disposed about the outside apparatus 10 may be constructed of a resilient plastic material which is capable of withstanding the temperature ranges encountered as well as physical abuse from the watering livestock. The thermal insulation 28 positioned between the inside of the casing 26 and the component parts of the apparatus may be of any suitable type, however, it has been learned that if the liquid foam type is used, it may be directly poured into the apparatus and after a short period of time it will harden to form a solid block of thermal insulation to produce a solid rigid construction between the outside casing and the internal parts.

The coupling element 30 positioned on the top of the fluid conduit 12 should line up with the apertures 32 in the casing 26 to provide an access point for a device utilizing the water. This may be a simple elbow connection or a T connection if there is more than one livestock watering installation connected to the fluid conduit 12 at this location.

A second embodiment of the electrically heated fluid coupling apparatus is shown in FIG. 4. This embodiment enables more than one livestock watering installation to be connected where only one water source is available or only one connection to the water line is desired. The construction of the vertical section of the second embodiment is essentially the same as that described above for FIGS. 1-3. The fluid conduit 12 is connected at its lower end 14 to the fluid source 16. The hollow heating conduit 18 passes along one side of the fluid conduit 12 with the electric resistance heating element 20 disposed inside the hollow heating conduit 18. The power cable conduit 22 passes along the outside of the fluid conduit 12 and carries the power cable 24 from an underground connection to the electrical source (not shown) to the top of the apparatus for connection with the electric resistance heating element 20 within the end cap 34.

Instead of having the livestock watering device directly connect to the coupling element 30 as discussed in reference to FIGS. 1-3 additional fluid conduits 38 and 40 are connected to the coupling element 30. The desired length of the second and third fluid conduits 38 and 40 are adjustable, depending upon the individual circumstances. It is feasible that the conduits would travel for several feet providing multiple access points for livestock watering installations located in adjacent livestock holding pens. The construction surrounding the second and third fluid conduits 38 and 40 is identical to the construction of the main vertical section with the deletion of the power cable conduit 22 and the power cable 24 running along the side of the respective fluid conduit. Positioned along one side of the fluid conduits 38 and 40 is the hollow heating conduit 18a and 18b respectively within which the electric resistance heating elements 20a and 20b respectively are positioned. All three heating elements are tied into the main power cable 24 at the top of the apparatus and within the end cap 34. Also shown in FIG. 4 is a thermostat 42 which may be adjusted to automatically turn on the electric resistance heating elements 20, 20a and 20b when the temperature drops to a predetermined level. A second coupling elment 30 is shown in FIG. 4 attached to the second fluid conduit 38. This coupling element may be of the same type as disclosed for the element positioned upon fluid conduit 12 such as a T connection; or, in cases where only one access point is desired, an elbow connection may be employed. An end cap 34 is attached to the ends of the apparatus to prevent the watering livestock from damaging the insulation contained within the casing 26.

A third embodiment of the invention is disclosed in FIG. 5. The construction of the apparatus is identical to that as disclosed above with reference to FIGS. 1-4 except for the addition of a second coupling element 30a attached to the fluid conduit 12 between the regular coupling element 30 and the surface. This provides a water access point at a different height from that which would normally be available through the regular coupling element 30. This particular embodiment would be well adapted for use when various size animals, including very young and those fully grown, would be required to use the same watering system. FIGS. 3 and 5 also show the apparatus equipped with a demand deliverly livestock waterer 46. This particular type is marketed by the Letiex Livestock Products Company as Model L-70.

Obviously many modifications and variations of the present invention are possible in the light of the above teachings. It is therefore to be understood that, within the scope of the appended claims, the invention may be practiced otherwise than as specifically described.

We claim:
1. An electrically heated fluid coupling apparatus exposed to severe weather conditions for connecting below the ground a fluid source to an external device for using the fluid comprising:
   a fluid conduit adapted at its lower end to be connected to a fluid source below the ground surface;
   a hollow heating conduit extended longitudinally in side-by-side heat exchange contact with said fluid conduit, having a length approximate that of said fluid conduit, said heating conduit having an upper end extended above the upper end of said fluid conduit;
   an electric resistance heating element disposed within said hollow heating conduit and extending the approximate length thereof, said element having terminals extended outwardly from the upper end of said heating conduit;
   electric means for electrically connecting said heating element to a source of electric energy, said electric means comprising an elongated hollow tube extended through substantially the length of said heating conduit, and an electrical cable ex- tended through said tube, said tube extended closely adjacent in side-by-side relationship with said fluid conduit from a point below the ground surface and terminating in an open upper end above said fluid conduit upper end, said cable having an end extended outwardly of said tube upper end;

an outside casing disposed about said fluid conduit, said heating conduit and said electric, means, said casing having at least one aperture formed therein and having a length at least as coextensive with that of said heating conduit, said one or more apertures being above the ground surface, said casing upper end being open through which sole access can be obtained to the open upper ends of said heating conduit and hollow tube;

thermal insulation disposed within said outside casing and substantially filling the space therewithin about said fluid conduit, said heating conduit and said electric means;

coupling means within said casing affixed to said fluid conduit and registered with each of said at least one aperture for providing access to the fluid delivery external devices; and top means affixed to the upper end of said casing for closing said upper end, said top means removably secured to the upper end of said casing and cooperating with the upper end thereof to provide an enclosure within which the electrical connection between said electric resistance heating element and said electrical cable can be made.

2. An electrically heated fluid coupling apparatus as defined in claim 1, wherein:

said electric resistance heating element is removably disposed within said hollow heating conduit.

3. An electrically heated fluid coupling apparatus as defined in claim 1, wherein:

a water device is inserted through each aperture and connected to said coupling means registered therewith for providing fluid upon demand.

* * * * *